Dec. 7, 1965  E. A. KIESSLING  3,221,769
FUNCTIONAL CONTROL VALVES FOR PNEUMATIC PROSTHESES
Filed May 29, 1963  7 Sheets-Sheet 1
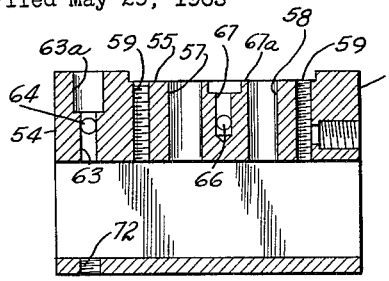
Fig.10
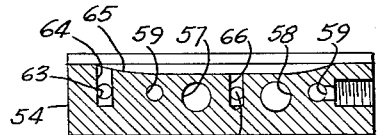
Fig.11
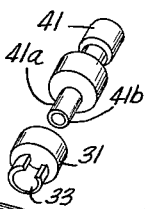
Fig.1
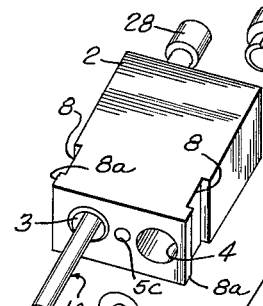
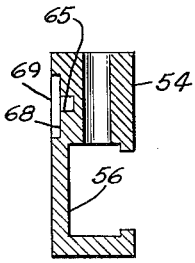
Fig.12
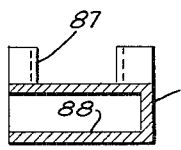
Fig.14
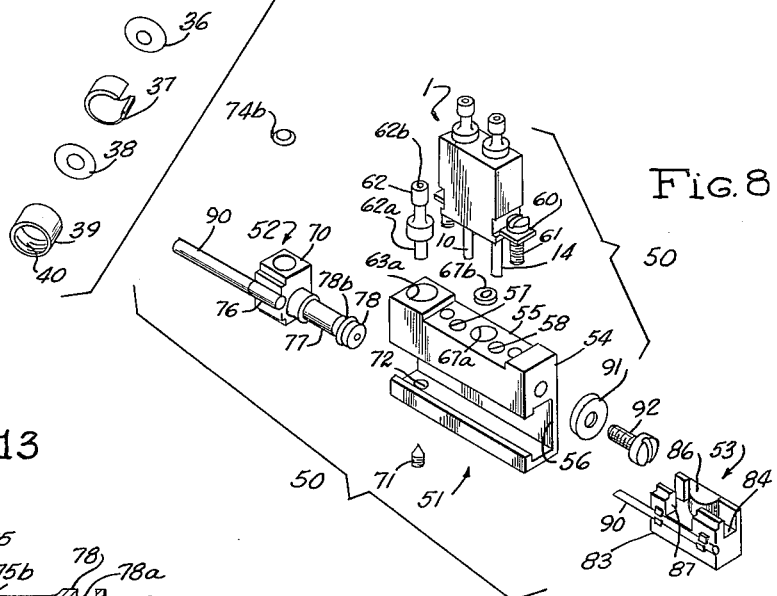
Fig.8
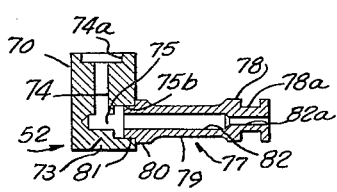
Fig.13
INVENTOR.
EDWARD A. KIESSLING
BY
ATTORNEY Dec. 7, 1965 E. A. KIESSLING 3,221,769
FUNCTIONAL CONTROL VALVES FOR PNEUMATIC PROSTHESES
Filed May 29, 1963 7 Sheets-Sheet 2

INVENTOR.
EDWARD A. KIESSLING
BY *[signature]*
ATTORNEY

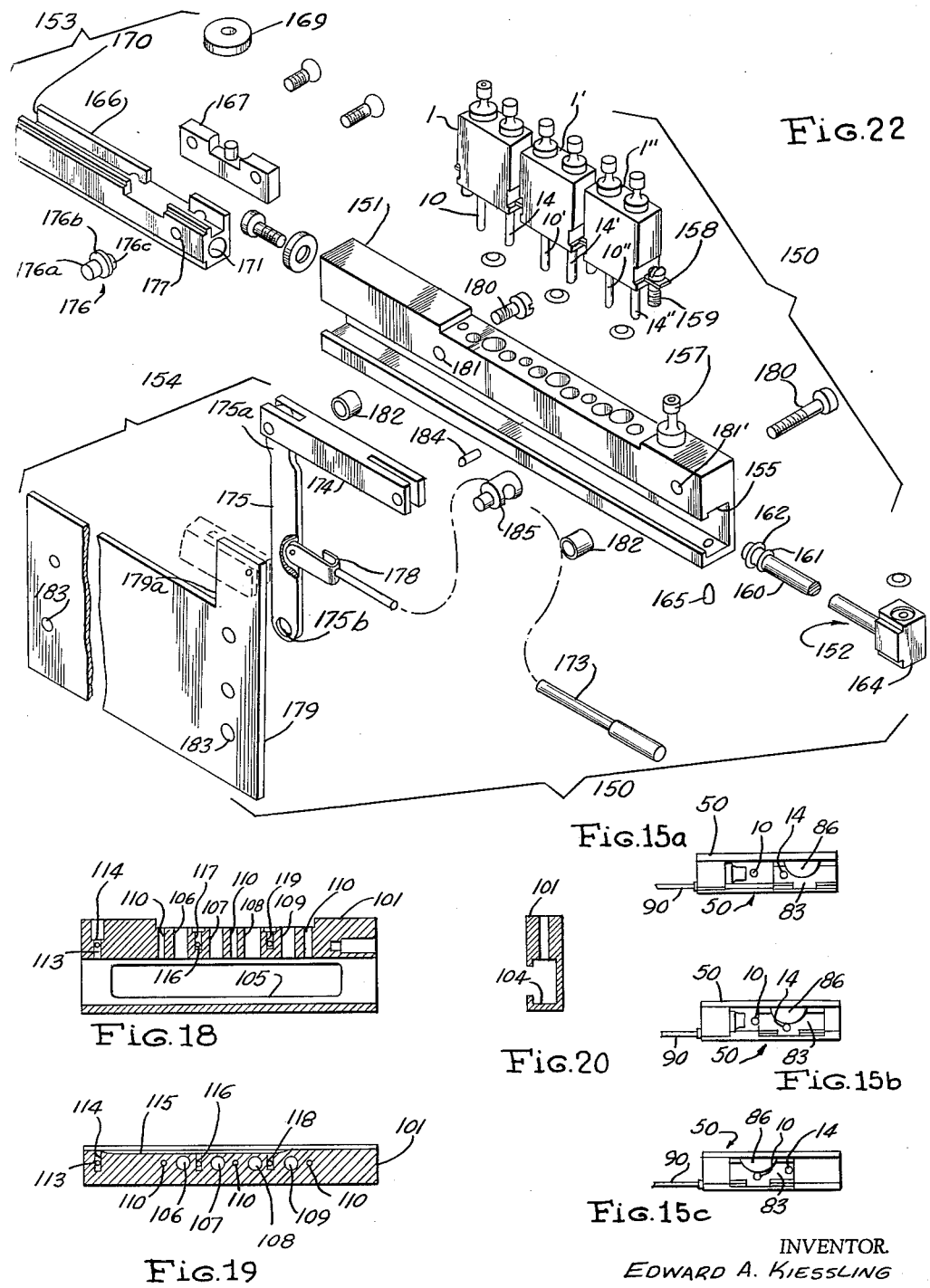

Dec. 7, 1965 E. A. KIESSLING 3,221,769
FUNCTIONAL CONTROL VALVES FOR PNEUMATIC PROSTHESES
Filed May 29, 1963 7 Sheets-Sheet 4
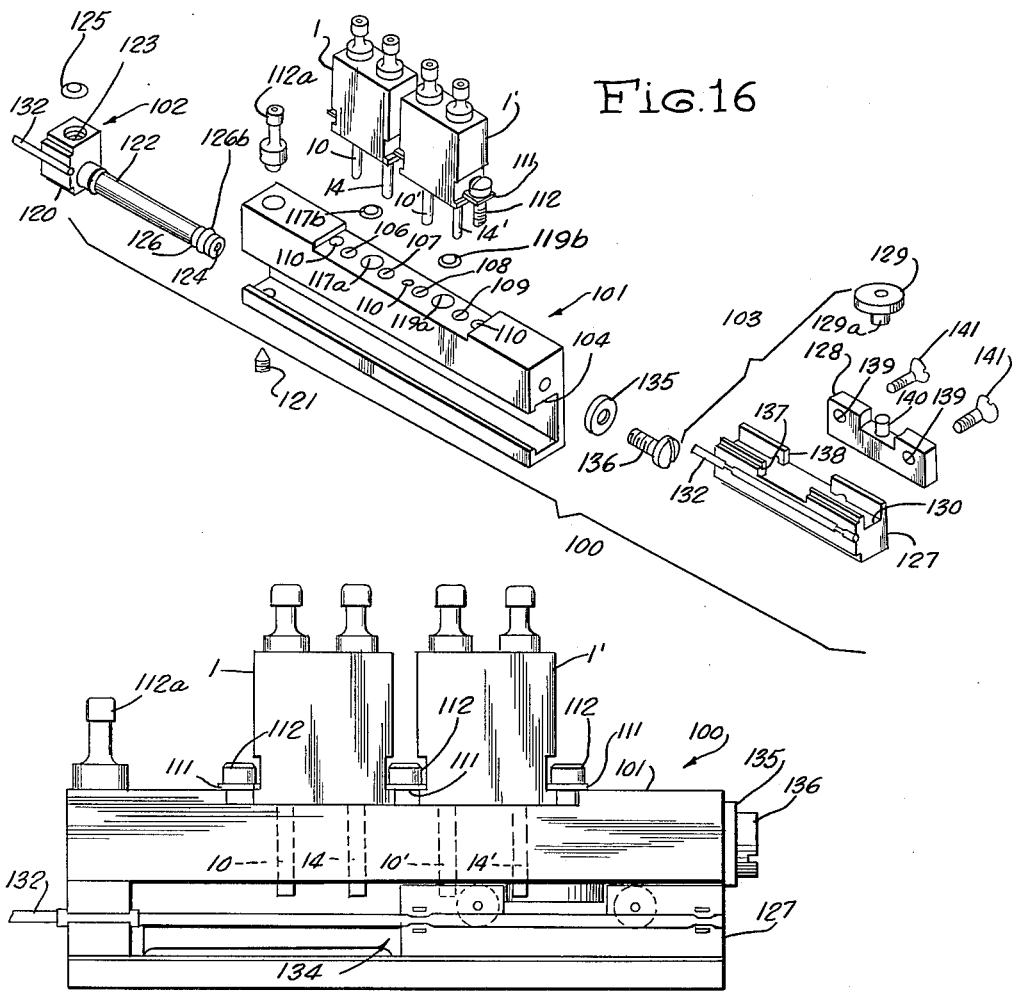
INVENTOR.
EDWARD A. KIESSLING
BY
ATTORNEY

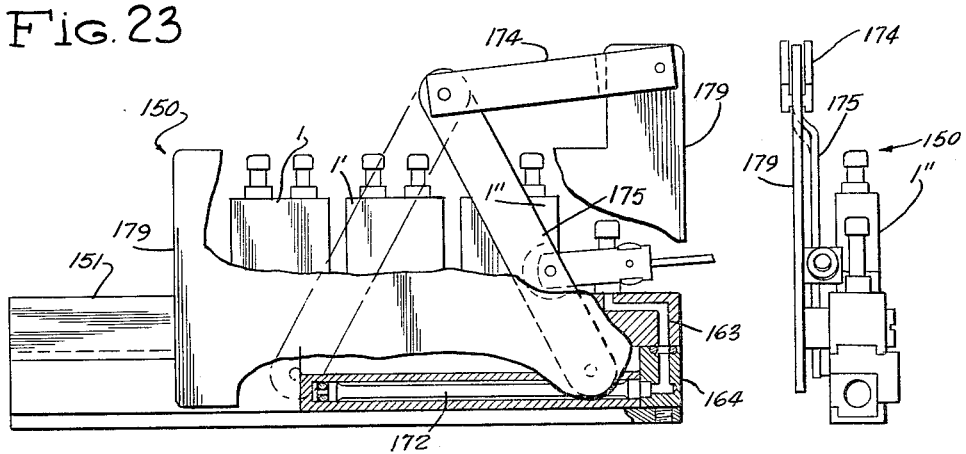
Fig. 23
Fig. 24
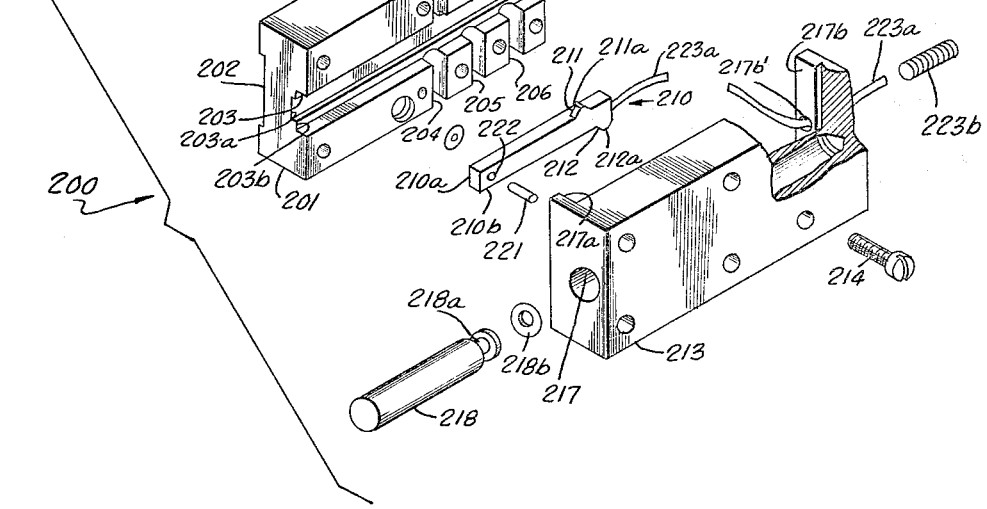
Fig. 25

Dec. 7, 1965 E. A. KIESSLING 3,221,769
FUNCTIONAL CONTROL VALVES FOR PNEUMATIC PROSTHESES
Filed May 29, 1963 7 Sheets-Sheet 6
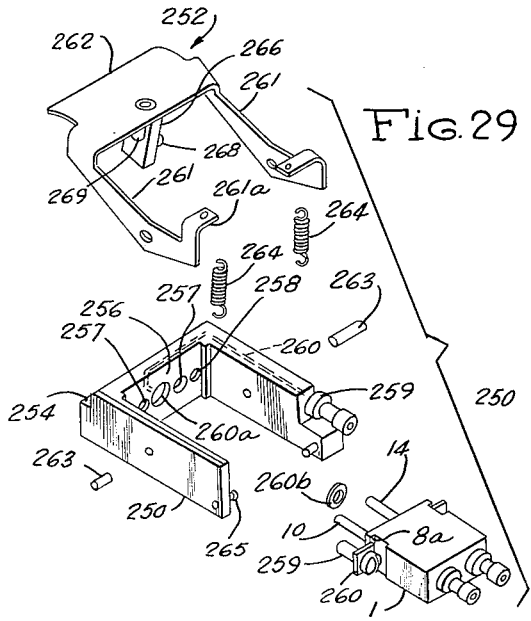
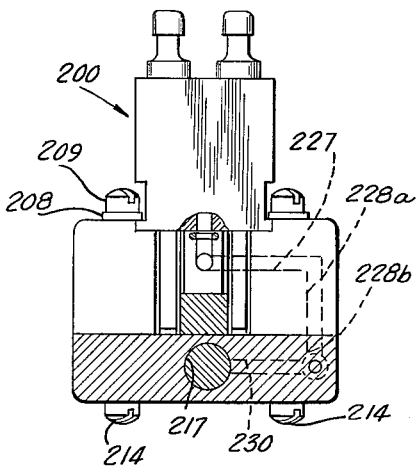
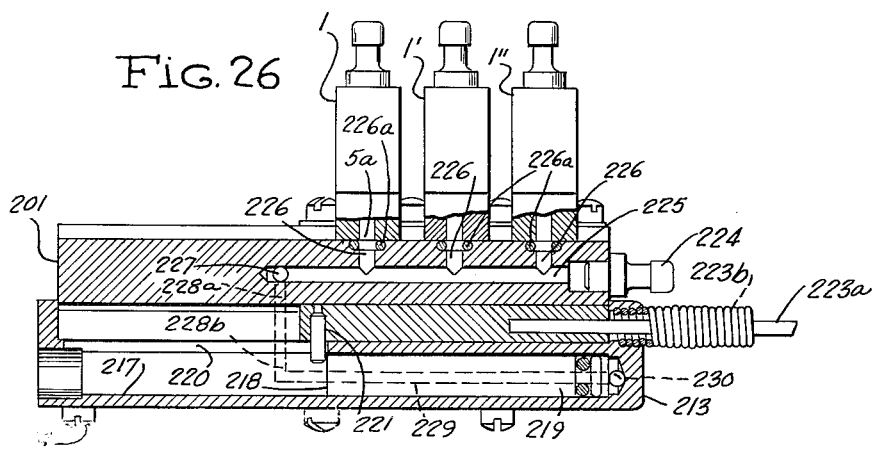
INVENTOR.
EDWARD A. KIESSLING
BY
ATTORNEY

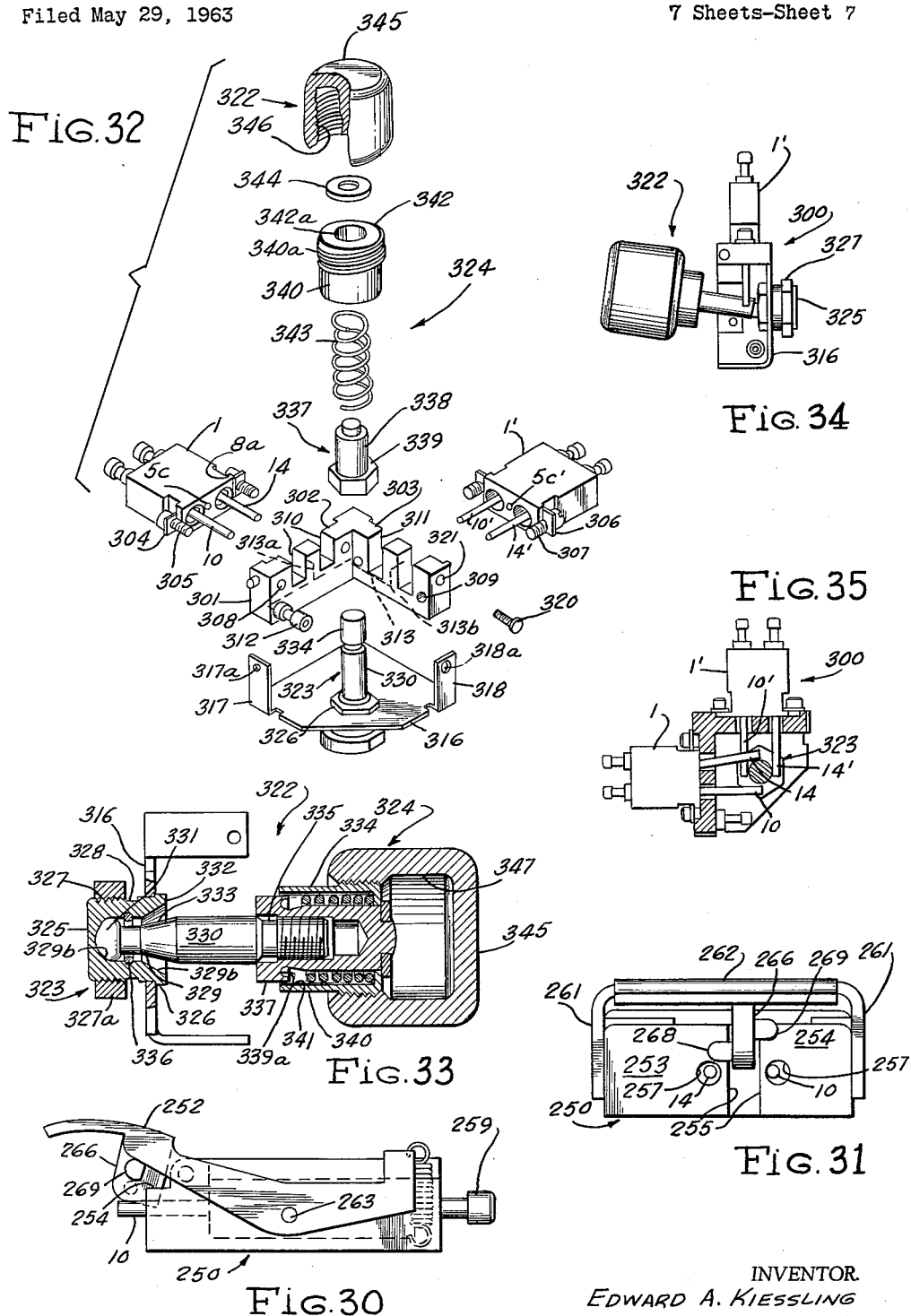

United States Patent Office 3,221,769
Patented Dec. 7, 1965

3,221,769
FUNCTIONAL CONTROL VALVES FOR
PNEUMATIC PROSTHESES
Edward A. Kiessling, Huntington, N.Y., assignor to the United States of America as represented by the Secretary of the Department of Health, Education, and Welfare, and/or the Secretary of the Army
Filed May 29, 1963, Ser. No. 284,271
20 Claims. (Cl. 137—596)

The invention described herein may be manufactured and used by or for the Government for governmental purposes without the payment to me of any royalty thereon.

This invention relates to the field of control valves for regulating gas flow, more particularly to valves for controlling the flow of gas into and out of the operating elements of gas powered artificial arms.

It is generally recognized that the next major advance in upper extremity prosthetics will be the efficient employment of external power to replace the amputee's body power. Artificial arms and hands powered by electricity and by compressed gas have been, and are being, worked on in this country and abroad. The American Institute for Prosthetic Research has developed a pneumatic arm using liquid carbon dioxide as a source of power. Vapor from a container partially filled with liquid $CO_2$ is fed through a regulator and emerges as gas at high pressure (e.g., 100 p.s.i.). This gas is selectively directed by the amputee to the several pneumatic servo mechanisms which produce controlled arm and hand (or hook) motions. These pneumatic servo mechanisms, on improved versions of the A.I.P.R. arm, are in the form of dual acting servo motors. One or more multiple flow control valves (hereinafter referred to as "functional control valves") operated by the amputee-wearer are used to selectively control the dual acting servo motors. Among the contributions which the applicant has made to the development of the A.I.P.R. arm is the invention of the several functional control valves which are the subject of this application. It will be obvious that these valves can be used with other pneumatic prosthetic devices besides the A.I.P.R. arm.

In the conception and development of the functional control valves of the present invention, the applicant had to resolve or comprise numerous conflicting considerations. A limited number of standard valves had to be devised although each amputee presents unique problems in the nature and degree of his amputation, the number and nature of functions to be performed by his prosthetic device and in the availability and desirability of various body control sites through which the amputee can operate a control valve. Problems of weight, size, durability, reliability, ease of maintenance, sensitivity, ease of operation, and economy had to be solved in making the valves.

The present invention comprises valves which are variously operated by pulling, pressing and shifting motions. Conventional and some unconventional body control sites may be used to operate these valves. Cineplasty tunnels, scapular spread, shoulder hike, chest or abdominal expansion may be used to actuate the pull type valves. The diametral expansion of a muscle or the motion of a short above elbow stump may be used to operate a properly designed pressure valve, while the motion of a humeral prominence (in a shoulder disarticulation case) or a short above elbow stump can work a suitable shift valve.

Sensory feedback is a serious problem in pneumatic prostheses. Ideally some means should be provided to enable the wearer to "feel" the position and action of the various elements of his prosthesis to supplement his own visual observation of what his artificial arm is doing. The applicant has addressed himself to this problem of sensory feedback in the present invention.

Accordingly, an object of the present invention is to provide improved valve means for controlling the flow of gas to and from a dual acting servo motor.

Another object is to provide sensitive, reliable, compact and efficient valve means, which may be actuated by various body control sites, for controlling the flow of gas to and from the dual acting servo motors of a pneumatic prosthetic device.

Another object is to provide valve means of the character described with sensory feedback means to enable the amputee to feel the position and action of his prosthetic device.

Another object is to provide a basic valve module adapted to control a single function of a pneumatic prosthetic device.

Another object is to provide functional control valves embodying one or more basic valve modules adapted to control a corresponding number of functions of a pneumatic prosthetic device, said functional control valves actuated in various ways by the amputee through a variety of body control sites.

These and other objects and advantages of the invention will be understood from the description which follows and the drawings in which:

FIG. 1 is a perspective, partly exploded view of the basic valve module;

FIGS. 2, 4, and 6 are bottom plan views of the basic valve module;

FIGS. 3, 5, and 7 are partly sectional elevations of the basic valve module taken along lines 3—3, 5—5, and 7—7 in FIGS. 2, 4, and 6 respectively;

FIG. 8 is a perspective, partly exploded view of a single function pull valve;

FIGS. 10–14 are partly sectional views of various components of the valve of FIG. 8;

FIGS. 15a, 15b, 15c are sectional plan views of the valve of FIG. 8 showing the actuator block in various operating positions;

FIG. 16 is a perspective, partly exploded view of a two function pull valve;

FIG. 17 is a front elevation of the valve of FIG. 16;

Figure 21:
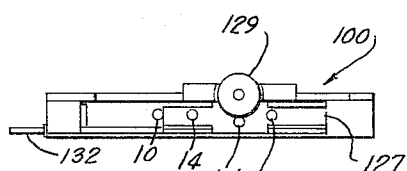

FIGS. 18, 19, and 20 are front, top and side sectional views of the valve body of the valve of FIG. 16;

FIG. 21 is a sectional plan view of the valve of FIG. 16 showing the actuator block in one of its operating positions;

FIG. 22 is a perspective, exploded view of one embodiment of a three function pull valve;

FIGS. 23 and 24 are partly sectional, front and side elevations respectively of the valve of FIG. 22;

FIG. 25 is a perspective, exploded view of a second embodiment of a three function pull valve;

FIGS. 26 and 27 are partly sectional, front and side elevations respectively of the valve of FIG. 25;

FIG. 28 is a partly sectional plan view of the valve of FIG. 26 showing the actuator slide in one of its operating positions;

FIG. 29 is a perspective, exploded view of a single function pressure valve;

FIGS. 30 and 31 are side and front elevations respectively of the valve of FIG. 29;

FIG. 32 is an exploded, perspective view of a two function shift valve;

FIG. 33 is a sectional view of the shift lever mechanism of the valve of FIG. 32; and FIG. 34 and 35 are side and top views respectively of the valve of FIG. 32 showing the shift lever in one of its operating positions (the actuator button assembly has been removed in FIG. 35).

The valve block module shown in FIGS. 1–4 is used in each of the functional control valves of the present invention. This basic valve block module is a subminiature control valve mechanism designed to regulate the flow of gas, furnished from a supply source, into and out of a dual acting, proportional, penumatic servo motor. It may be used with motors which produces either linear or rotational movement.

The valve block module 1 comprises a module body 2 having a pair of parallel circular bores 3 and 4 drilled therethrough. The upper ends 3a and 4a of each of these circular bores are of larger diameter than the rest of the bores. Blind circular passages 5, 6 and 7 are also formed in module body 2, parallel to and generally between bores 3 and 4. Passage 5 communicates with bores 3 and 4 by lateral branches 5a and 5b, respectively. Lateral branch 6a interconnects pasage 6 and bore 3 while lateral branch 6b interconnects passage 6 and bore 4. The bottom opening of passage 6 is permanently closed by plug 6c. Lateral branches 7a and 7b connect passage 7 with bores 3 and 4 respectively. The lower end of passage 7 is permanently closed by plug 7c. A pair of rectangular grooves 8 are formed on opposite faces of module body 2 near the bottom thereof. These grooves are used in mounting one or more valve modules on a body or frame to create the various functional control valves of the present invention.

Valve actuator rod 10 having a short upper portion 11 and a longer lower portion 12 separated by land zone 13 is disposed in circular bore 3 with part of the lower portion 12 projecting out of the valve body. A valve actuator rod 14 having an upper portion 15, lower portion 16 and land zone 17 is similarly disposed in circular bore 4.

A generally cylindrical adapter 18 having an axial bore 19 is mounted in the enlarged upper end 3a of circular bore 3. Split ring 20 formed as an integral part of adapter 18 extends downward into bore 3. The lateral opening in split ring 20 is aligned with lateral branch 7a. Upper O ring valve gland 21 is disposed in bore 3 below split ring 20 and split ring 22 is disposed in bore 3 below valve gland 21. The lateral opening in split ring 22 is aligned with lateral branch 5a.

The bottom edge of split ring 22 contacts the upper surface of land zone 13 of the valve actuator rod. The lower surface of the land zone bears against central O ring valve gland 23. Split ring 24 disposed in bore 3 immediately beneath O ring 23 has its lateral opening aligned with lateral branch 6a. Next, below split ring 24, in bore 3 is lower O ring valve gland 25. The lower O ring is held in place by cylindrical lower spacer 26 having an axial bore or vent port 27 of greater diameter at its bottom than at its top. The lower portion 28a of tubing fitting 28 is seated in axial bore 19 of adapter 18. Tubing fitting 28 also has longitudinal circular passage or gas port 28b. The inside diameters of O ring valve glands 21, 23 and 25 are such that there is a tight sealing fit between the O rings and actuator rod 10. Actuator rod 10 is in its neutral position when in the position illustrated in FIG. 3. A first chamber 29 is defined by upper valve gland 21, split ring 22 and valve actuator rod 14. A second chamber 30 is defined by central valve gland 23, split ring 24, lower valve gland 25 and actuator rod 14.

The components of the valve block module associated with bore 4 are similar to the components associated with bore 3 and, in general, are arranged in a similar fashion. They comprise a generally cylindrical adapter 31 having an axial bore 32 and a lower split ring portion 33 whose lateral opening is aligned with lateral branch 6b. Beneath split ring portion 33 is upper O ring valve gland 34 and split ring 35 whose outer opening confronts lateral branch 5b. The bottom edge of split ring 35 bears against the upper surface of land zone 17.

The lower surface of land zone 17 bears against central O ring valve gland 36 which in turn rests on split ring 37 whose lateral opening is aligned with lateral branch 7b. Lower O ring valve gland 38 and lower spacer 39 having a two diameter axial bore or vent port 40 complete the asembly within bore 4. The lower portion 41a of tubing fitting 41 is fitted in axial bore 32. Tubing fitting 41 also comprises an axial passage or gas port 41b. First chamber 42 is defined by upper valve gland 34, split ring 35 and actuator rod 14. A second chamber 43 is defined by central valve gland 36, split ring 37, lower valve gland 38 and actuator rod 14.

When in use, gas supply port 5c of the valve block module is connected to a suitable source of pressure gas. The valve block module was designed to operate on carbon dioxide gas at 100 pounds per square inch pressure derived from a regulated liquid carbon dioxide manifold. The valve block module, however, has been successfully operated with such other pneumatic media as compressed air, oxygen, and Freon at supply line pressures varying between 15 p.s.i. and 500 p.s.i. Tubing fittings 28 and 41 are connected by suitable conduits, such as flexible polyvinyl chloride tubing, to two similar fittings located at opposite ends of the penumatic servo motor which is to be controlled by the valve block module. A closed loop pneumatic servo system is thus formed between the valve module and the servo motor.

The components of the valve block module should be made of nonferrous materials and should be relatively insensitive to moldly corrosive media. The several valve gland elements should be made of a resilient material such as a rubber compound which is not pressure sensitive and will not cold flow or distort under normal operating loads.

As will be explained more fully hereafter the rate and direction of flow in the servo system is regulated by deflecting either actuator rod 10 or 14. When either rod is deflected, it distorts the related upper and lower valve glands simultaneously permitting gas flow through the system directly proportional to the extent of actuator rod displacement.

The valve gland seals are not subject to frictional, abrasive wear because there is practically no relative motion between the rubber and metallic parts. The seals are opened by compressive deformation and the inherent resiliency of the rubber seals returns the actuator rods to their normal closed positions when the deflective load on the rod is released. Because of its unique operating principal, the valve block module is within practical limits devoid of wear and fatigue problems.

During all phases of operation, gas under pressure enters the module at supply port 5c, pressure is continuously maintained in chambers 29 and 42 through the gas supply passages consisting of passage 5 and lateral branches 5a and 5b. When all the "O" rings are in their neutral or valve closed positions shown in FIG. 3, there is no flow through the valve module or through the system. The servo system is in static balance; the piston of the servo motor is stationary because of equal pressure on both sides. Inasmuch as both the valve module and the servo motor are made leak free, the servo motor is statically blocked and maintains its position as along as the valve module is in the neutral position of FIG. 3.

Figure 2:
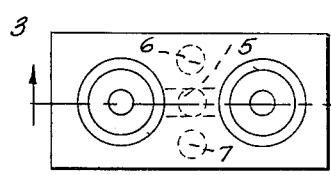
Figure 4:
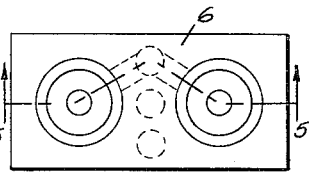
Figure 6:
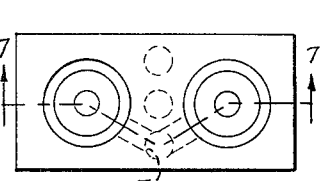
Figure 3:
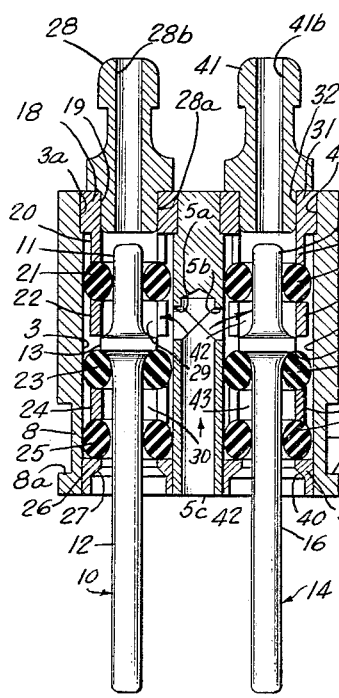
Figure 5:
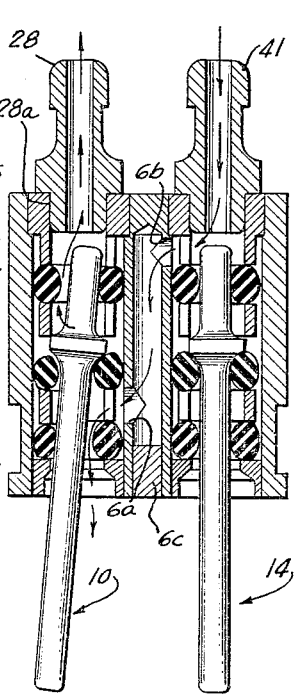

Referring to FIG. 5 when valve actuator rod 10 is sufficiently deflected from its normal position, it pivots on central valve gland 23 and deforms a portion of upper "O" ring 21 and lower "O" ring 25 opening a passage between the actuator rod and the opposite internal sides of those valve glands. The upper valve gland is closer to the axis about which actuator rod 10 pivots than is the lower gland, hence the opening formed at lower valve gland 25 is larger than that formed at upper valve gland 21. When actuator rod 10 is sufficiently deflected, gas entering at gas supply port 5c proceeds through the supply passage 5 and 5a to chamber 29, thence through the opening between the actuator rod and upper "O" ring 21 through gas port 28b of tubing fitting 28 and through the attached tubing into one side of the servo motor. At the same time, as the piston moves, gas previously trapped on the opposite side of the piston returns to tubing fitting 41 whence it follows gas port 41b and the passage formed by lateral branch 6b, passage 6, and lateral branch 6a to chamber 30. From chamber 30 the returning gas flows through the space between the lower portion 12 of actuator rod 10 and lower valve gland 25 and through vent port 27 to the atmosphere.

Figure 7:
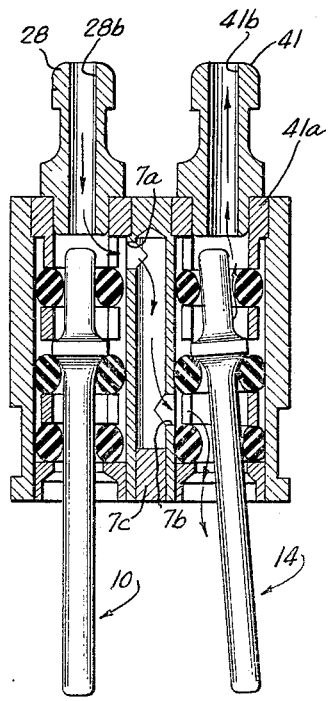
Figure 9:
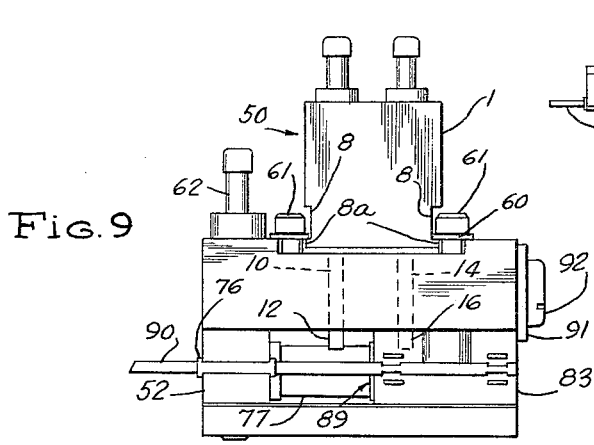
FIG. 9 is a front elevation of the valve of FIG. 8.

Referring to FIG. 7 when actuator rod 14 is sufficiently deflected the flow of gas through the servo system is in the opposite direction from that just described. The incoming gas proceeds through the gas supply passage, chamber 42, the space between upper valve gland 34 and the upper portion 15 of actuator rod 14 to gas port 41b of tubing fitting 41, thence through the connected tube to the second side of the servo motor where it causes the piston to be displaced in the direction opposite to that previously described. Gas from the first side of the servo motor flows through the attached tube to gas port 28b of fitting 28, thence through the passage formed by lateral branch 7a, passage 7 and lateral passage 7b to chamber 43. From chamber 43 the flow is through the space between the lower portion 16 of actuator rod 14 and lower valve gland 38 through vent port 40 to the atmosphere.

A number of valve modules of the present invention have been constructed and used experimentally. Valve modules have been made for example having a module body 2 measuring .580 inch by .534 inch by .250 inch, "O" rings of .056 inch inside diameter and actuator rods whose upper and lower portions measured .062 inch in diameter and whose lower portions projected .375 inch beyond the bottom of the valve body. In these modules the circular area within which the lower tips of the actuator rods 10 and 14 may be deflected measures .186 inch in diameter. At maximum actuator rod deflection the area of the opening formed between the upper "O" ring and the actuator rod is .0026 square inch and the area of the opening between the actuator rod and the lower valve gland is .0031 square inch. By designing the valve module so that the opening past the lower valve gland is always larger than the opening past the upper valve gland exhaust drag is reduced to a minimum. The rate of gas flow through the servo system and hence the servo motor speed is proportional to the degree of deflection of the appropriate actuator rod. In the described models deflections of the actuator rod between .000 and .015 inch do not open the seals when the line pressure is 100 p.s.i.; minimal gas flow starts at .016 inch of actuator deflection.

It should be obvious that the valve module may be made in a wide range of sizes and that it may be adapted to handle different volumes of gases and rates of flow by changing dimensions of various components.

The single function (two-phase) pull valve illustrated in FIGS. 8 through 15c can control any dual acting pneumatic prosthetic component from a single, harness cable, control source. This single function pull valve was designed, however, primarily for the separate control of a pneumatic terminal device.

The principal components of the single function pull valve 50 are the valve body subassembly 51, the air feed subassembly 52, the actuator slide assembly 53 and a valve block module 1, identical to the module previously described. The generally rectangular valve body 54 has a recessed area 55 on its top surface in which valve module 1 is mounted, and a longitudinal T-shaped slot 56 in which air feed subassembly 52 is rigidly mounted and actuator slide assembly 53 is slidably received. Parallel circular bores 57 and 58 pass from recessed area 55 to the top of T-shaped slot 56. Circular bores 57 and 58 are dimensioned to receive respectively valve actuator rods 10 and 14, the actuator rods being capable of sufficient deflection from their normal positions to control the passage of gas through valve module 1. The lower portions 12 and 16 of the two valve actuator rods depend into T-shaped slot 56 when valve block module 1 is in position. Spaced apart tapped holes 59 are also provided in recessed area 55 of valve body 54.

Valve block module 1 is mounted on valve body 54 by means of square washers 60 which engage the lower lips 8a of grooves 8 of the module and which are themselves held in place by screws 61 screwed into tapped holes 59.

Pressure gas delivered by suitable tubing to gas supply fitting 62 is carried through an interior passage in the top portion of valve body 54 to inlet port 5c of valve block module 1. This valve body gas supply passage includes the upper portion of a vertical passage 63 which connects gas supply fitting 62 with T-shaped slot 56. The valve body gas supply passage also includes first lateral passage 64, longitudinal channel 65, second lateral passage 66 and a second vertical passage 67. A relatively wide shallow longitudinal groove 68 is cut into the back surface of valve body 54, longitudinal channel 65 is formed as a narrow groove cut in the bottom of the wider longitudinal groove 68. A cover plate 69 is fitted into longitudinal groove 68 and fastened there by cement or other suitable means. Longitudinal channel 65 together with cover plate 69 thus form an inclosed conduit to convey gas from first lateral passage 64 to second lateral passage 66. Gas supply fitting 62 includes a cylindrical lower portion 62a which fits into counterbore 63a in valve body 54. When gas supply fitting 62 is mounted on the valve body, the axial passage 62b in the gas supply fitting is aligned with vertical passage 63 of the valve body.

Second vertical passage 67 is counterbored at its top 67a to receive "O" ring 67b. This "O" ring insures a leakproof connection between second vertical passage 67 and gas inlet port 5c of the valve block module.

T-shaped port block 70 is dimensioned to form a close fit when inserted in T-shaped slot 56 of the valve body. The port block is held in place in the valve body by cone-point set screw 71 which is screwed into threaded hole 72 in the valve body and projects into a countersunk hole 73 in the port block. Port block 70 has a blind vertical passage 74 which communicates with a blind longitudinal passage 75.

When the port block 70 is installed in the valve body, vertical passage 74 is aligned with the vertical passage 63 in the valve body. The upper end 74a of vertical passage 74 is counterbored to receive O ring 74b thus insuring a leakproof connection between the two vertical passages. The end 75a of longitudinal passage 75 is counterbored to receive one end of a stationary piston to be described hereafter. A longitudinal tubular cable guide 76 of nylon or other suitable material is recessed into the front face of the port block.

A rectangular nylon gasket (not shown) having a circular opening aligned with inlet port 5c and circular openings to accommodate valve actuator rods 10 and 14 may be placed between the bottom of valve block module 1 and recessed area 55 of valve body 54 when these two components are assembled to improve the seal.

Stationary piston member 77 comprises a piston portion 78 having an annular groove 78a, a shank portion 79, a flange portion 80 and cylindrical base portion 81. An axial passage 82 is provided through the stationary piston member; the end portion 82a of the axial passage may be of reduced diameter. Operation is improved when the diameter of reduced portion 82a is approximately one-half the diameter of the rest of passage 82. The base portion 81 of the piston member may be press-fitted into counter bore 75a and port block 70 may then be fastened to stationary piston member 77 by silver brazing around the periphery of flange 80 or by other suitable means.

The outside configuration of actuator block 83 is generally T-shaped and the actuator block is slidably received in T-shaped slot 56 of valve body 54. A generally rectangular longitudinal slot 84 is cut in the top surface of actuator block 83. A curved camming member 86 is provided at the back wall of longitudinal slot 84. For convenience of manufacture curved camming member 86 may be separately fabricated as part of a section of a cylinder. The rear wall of longitudinal slot 84 may be cut away (see FIG. 14) and camming member 86 may be inserted and affixed therein. A rectangular opening 87 is provided in the front wall of longitudinal slot 84 opposite camming member 86.

Longitudinal slot 84 and camming member 86 are so shaped that when actuator block 83 is slid back and forth in the valve body's T-shaped slot 56, valve actuator rods 10 and 14 project downwardly into longitudinal slot 84. Valve actuator rods 10 and 14 are individually separately deflected when contacted by camming member 86; rectangular opening 87 in the front longitudinal slot 84 accommodates the lower portion of each actuator rod when it is deflected by the camming member. A longitudinal cylindrical bore 88 is provided in one end of actuator block 83 beneath longitudinal slot 84. This bore together with the piston portion 78 of stationary piston member 77 forms feed back servo motor 89 whose function will be explained presently. O ring 78b installed in annular groove 78a prevents the leakage of gas past the piston of feed back servo motor 89.

Actuating cable 90 which is staked and soldered in a slot provided in the front face of actuator block 83 and slidably passes through cable guide 76 is used to pull actuator block 83 to positions where its camming member deflects either valve actuator rod 10 or valve actuator rod 14. Constant pressure gas admitted to the chamber of feedback servo motor 89 causes actuator block 83 to move back towards its original position whenever the tension on flexible cable 90 is relaxed. Stop washer 91 attached to valve body 54 by screw 92 serves to limit the return travel of the actuator block.

The single function (2 phase) pull valve 50 may be mounted inside the forearm shell, the upper arm shell, or within the shoulder cap of a prosthesis wherever it is most convenient. A two-part Belden cable which includes a stationary outer cable and a movable inner harness cable may be used with the single function pull valve. In use, the outer Belden cable may be anchored onto a valve mounting clip (not shown) and brought through a hole in the prosthetic shell, then fastened to the exterior surface of the shell with force point anchor clamps in a manner obvious to those skilled in the art. The inner movable harness cable which corresponds with cable 90 in the drawing may be attached to the prosthetic harness by a ball swivel.

A number of full scale operating models of the single function pull valve 50 have been constructed having an actuator block 83 whose maximum travel is .399 inch. The valve body 54 of the models made from $\frac{5}{16}$ inch by $\frac{3}{4}$ inch aluminum bar stock is 1.070 inches long. Supplied with carbon dioxide or other gas, at 100 pounds per square inch pressure, through gas supply fitting 62, feedback servo motor 89 causes 2.4 pounds tension to be maintained in harness cable 90 when cam member 86 is not touching either valve actuator rod 10 or 14. The harness cable tension increases to 3 pounds when the cam member is deflecting one of the actuator rods. The varying tension in the harness cable provides a form of sensory feedback which enables an amputee to feel each position of the valve.

FIG. 15a illustrates the relative positions of cam member 86 and valve actuator rods 10 and 14 when the valve is in its neutral position, no gas is flowing through the servo system controlled by valve block module 1. The servo motor is blocked and the associated prosthetic element is stationary. FIG. 15b illustrates the relative positions of the camming member and valve actuator rods when the amputee has exerted sufficient pull on the harness cable to cause camming member 86 to deflect valve actuating rod 14 to the maximum extent. Gas is flowing in one direction through the servo system controlled by valve block module 1, the servo motor and associated prosthetic element are moving in the direction associated with such flow. FIG. 15c illustrates the relative positions of the cam member and valve actuator rods when the amputee has exerted sufficient tension on the harness cable to pull actuator block 83 to its second operating position. Valve actuator rod 10 is now fully deflected; flow through the servo system is in the opposite direction from that associated with the cam position shown in FIG. 15b. The servo motor and prosthetic element now move in the opposite direction.

In actual use the amputee does not have to follow any sequential pattern. Guided by the sensory feedback developed by feedback servo motor 89 and transmitted to him through harness cable 90 the amputee, by pulling on or releasing cable 90, can quickly move actuator block 83 to any desired position where it will completely or partially deflect either valve actuator rod or will contact neither actuator rod. The single function pull valve 50 is so constructed that differing rates of response may be preset into the valve. This is accomplished by loosening screws 61 and sliding valve block module 1 forward or backward on valve body 54 or by rotating valve block module 1 relative to valve body 54 and then tightening screws 61 fixing valve module 1 in place. By such adjustments the distances between one or both valve actuator rods and the cam member may be varied, thus changing the maximum rate of response for one or both valve phases. This adjustable feature is likely to be of particular value in controlling the speed of response and the gradation of pinch force in a terminal device. For example, valve block module 1 is frequently set in an angled position on the valve body so that a slow closing action of the terminal device may be combined with a rapid opening action.

The two-function (four phase) pull valve illustrated in FIGS. 16 through 21 may be used to control any two, dual acting, pneumatic servo motors through one prosthetic harness cable which is, in its turn, actuated by a single body control site. For example, valve block module 1 of two-function pull valve 100 may be used to control the wrist pronator servo motor of a prosthesis while valve block module 1' controls the elbow flexor servo motor of that prosthesis.

The design and mode of operation of the two-function pull valve is very similar to that of the single function pull valve. The principal components of the two-function pull valve 100 are the valve body 101, the gas feed subassembly 102, the actuator slide assembly 103 and the two valve block modules 1 and 1'. Valve body 101 is similar in shape but longer than the valve body of the single function pull valve. The back wall of its T-shaped slot 104 has a rectangular window 105 therein. Circular bores 106, 107, 108 and 109 are provided in valve body 101 to receive valve actuator rods 10, 14, 10' and 14' of the valve block modules. Three tapped holes 110 are also provided in the top of the valve body which are used together with square washers 111 and screws 112 to attach valve block modules 1 and 1' to valve body 101. The valve block modules may be rotated or translated to a limited extent in relation to the valve body. The maximum rate of response of each valve phase may thus be varied as in the single function pull valve.

Gas is supplied under pressure to the valve block modules through gas supply fitting 112a, the upper part of vertical passage 113, first lateral passage 114 and longitudinal channel 115. The gas to valve block module 1 proceeds from the longitudinal channel through second lateral passage 116 to second vertical passage 117 which is aligned with air inlet port 5c of the valve block module. "O" ring 117b inserted in counterbored portion 117a of the second vertical passage insures a leakproof connection.

Pressure gas from longitudinal channel 115 reaches gas inlet port 5c' of valve block module 1' through third lateral passage 118 and third vertical passage 119. "O" ring 119b set in counterbore 119a insures a leakproof connection between the third vertical passage and inlet port 5c'. The gas feed subassembly 102 is similar to the corresponding assembly of the single function pull valve except that it has a longer stationary piston member. The gas feed subassembly includes a T-shaped port block 120 held in place in T-shaped slot 104 of the valve body by cone point set screw 121. Stationary piston member 122 is affixed to port block 120. Vertical passage 123 in the port block interconnects with axial passage 124 through the stationary piston member. "O" ring 125 seals the connection between the vertical passages 113 and 123 in the valve body and port block, respectively. Stationary piston member 122 has a piston portion 126 at its distal end. "O" ring 126b set in an annular groove in the piston provides a tight seal between the piston portion and the cylindrical bore of the feedback servo motor to be described hereafter.

Actuator slide assembly 103 comprises actuator block 127, roller bracket 128, and cam roller 129. Actuator block 127 which is slidably received in T-shaped slot 104 of the valve body includes a longitudinal slot 130 along its top and a smaller longitudinal slot along its front face in which actuator cable 132 is received and anchored. The actuator block also has a longitudinal cylindrical bore, not shown, which together with piston 126 makes up feedback servo motor 134. The feedback servo motor 134 serves the same purposes as the feedback servo motor in the single function valve, i.e., by resistance to actuating cable 132, it provides the amputee with a feel of valve position. It also exerts a continual force tending to return the actuator block to its initial neutral position at the extreme right end of T-shaped slot 104. Excessive travel of the actuator block is prevented by stop washer 135 fastened to the valve body by screw 136. Rectangular openings 137 and 138 are provided in the front and rear walls, respectively of longitudinal slot 130. Roller bracket 128 having a pair of countersunk holes 139 and an upstanding central stud 140 is attached to the back surface of actuator block 127 by screws 141. Cylindrical cam roller 129 is rotatably mounted on stud 140; a central boss 129a on the bottom of the cam roller provides a bearing surface and reduces friction. A portion of cam roller 129 extends through rectangular opening 138 into the longitudinal slot 130 of the actuator block. Valve actuator rods 10, 14, 10' and 14' are each separately deflected by cam roller 129 when the actuator block is moved into a position in which the cam roller is aligned therewith. Roller bracket 128 and cam roller 129 project through rectangular window 105 in the back wall of the valve body. Rectangular window 105 must be of sufficient length so that that roller bracket does not impede the full travel of actuator slide assembly 103.

Two-function pull valve 100 may be mounted in the forearm shell, the upper arm shell, or within the shoulder cap of a prosthesis, whichever is most convenient. The inner cable of a two-part Belden cable may be used to move actuator slide assembly 103. The methods of mounting this two-function pull valve and attaching the Belden cable thereto is similar to the methods employed in the single function pull valve.

An amputee fitted with a prosthetic device employing a two-function pull valve can voluntarily control the direction and extent of motion of the two dual acting servo motors by manipulating his harness cable. When the amputee has procured a desired change in the condition of his prosthesis he may stop and block further motion of the particular servo motor involved by moving the cam roller to a neutral position between two valve actuator rods or by relaxing the tension on the inner Belden cable and allowing the actuator slide to snap back to its neutral position against stop washer 135.

A number of two-function pull valves have actually been constructed and are being tested in a field program. The test valves have been made so that the longest dimension is 2.625 inches and so that a one inch pull on the cable will move actuator slide assembly 103 through its entire operating travel.

The Type I three-function (six phase) pull valve illustrated in FIGS. 22 through 24 is designed to control three dual acting pneumatic servo motors by manipulation of a single actuating cable. This pull valve may, for example, be used by an amputee to control a three-function pneumatic prosthesis including a terminal device, a wrist pronator and an elbow flexor. Control is achieved through one prosthetic harness cable powered by a single body control site.

The Type I three-function pull valve 150 is basically very similar to the two-function pull valve except that three valve block modules are used rather than two and except that a walking beam mechanism is used to link the actuating cable to the actuator slide assembly. Through this mechanism relatively short movement of the cable causes relatively long travel of the actuator slide assembly.

The principal components of the Type I three-function pull valve 150 are basic valve block modules 1, 1' and 1", valve body 151, gas feeds subassembly 152, actuator slide assembly 153, and roller arm (walking beam) subassembly 154. A longitudinal T-shaped slot 155 is formed in valve body 151. A rectangular window (not shown) similar to that of the two-function pull valve is provided in the back wall of the T-shaped slot; a portion of the actuator slide assembly projects through this window. Valve body 151 is provided with circular bores, threaded holes and internal passages similar to those of the two-function pull valve so that valve block modules 1, 1' and 1" may be mounted on the valve body and supplied with compressed gas through gas supply fitting 157. Of course additional bores, passages and an additional threaded hole are needed for the third valve block module. The valve block modules are attached to valve body 151 by square washers 158 and screws 159; the individual modules may thus be rotated or moved forward or backward on the valve body to vary the maximum speed of response of particular functions or particular phases. Valve actuator rods 10, 14, 10', 14', 10", 14" extend downwardly through corresponding circular bores in the valve body into T-shaped slot 155. The gas feed subassembly 152 of the Type I three-function pull valve is similar to the corresponding assembly of the two-function pull valve except that stationary piston member 160 is longer on the three-function valve. Stationary piston member 160 is formed with a piston portion 161 at its distal end having an annular groove. "O" ring 162 is seated in this annular groove. Gas is supplied to the feedback servo motor of which piston 161 forms a part through an axial passage provided in the piston, passages through the port block, and a passage 163 in the valve body which communicates with gas supply fitting 157. T-shaped port block 164 is secured in place in T-shaped slot 155 by cone point set screw 165.

Actuator slide assembly 153 of the Type I three-function pull valve includes as did the actuator slide assembly of the two-function pull valve, an actuator block 166, a roller bracket 167 and cam roller 169, rotatably mounted on roller bracket 167 with a portion of the cam roller projecting into longitudinal slot 170 of the actuator block. Actuator block 166 which is longer than the actuator block of the two-function pull valve is provided with a longitudinal cylindrical bore 171. This cylindrical bore and the piston 161 form feedback servo motor 172 through which the amputee senses the condition of the pull valve and which returns the actuator slide assembly 153 to its initial neutral position when the amputee relaxes tension on the actuating cable. As in the two-function pull valve, the valve actuating rods are separately deflected by cam roller 169 when the amputee causes the actuator slide assembly to move. The maximum rate of response of each function and/or phase may likewise be varied by rotating or shifting valve module 1, 1′, or 1″ on valve body 151.

The movement of actuator slide assembly 153 is controlled by the amputee through flexible cable 173 which may be the inner element of a two-part Belden cable. The cable acts indirectly on the actuator slide assembly through roller arm subassembly 154, a walking beam-like mechanism, which multiplies the effective stroke of cable 173. The roller arm subassembly comprises a rocker arm 174 bifurcated at each of its ends; an offset portion 175a of roller arm 175 is pivotally mounted within one bifurcated portion of the rocker arm. The opposite or distal end of roller arm 175 has a transverse circular hole 175b which receives the enlarged cylindrical end 176a of pivot pin 176. The pivot pin includes a central flange portion 176b and a smaller cylindrical end 176c which is rotatably received in hole 177 formed in the front face of actuator block 176. Flexible cable 173 is pivotally connected to roller arm 175 at a point intermediate its offset portion 175a and transverse hole 175b by J-shaped cable tab 178.

Roller arm subassembly 154 is held in proper position relative to actuator slide assembly 153 by base plate 179. The base plate is fixed in spaced parallel relation to the front face of actuator block 166 by screws 180. The screws pass through holes 181 in valve body 151 and through cylindrical spacers 182 to the base plate where they engage threaded holes 183. The second bifurcated end of rocker arm 174 straddles projecting leg 179a of the base plate and is pivotally attached thereto by pin 184. With rocker arm 174 so connected to base plate 179, roller arm 175 depends into the space between the base plate and the front face of valve body 151 and is free to move in combined rotation and translation in that space. A cable mounting button 185 through which flexible cable 173 passes is attached to the inner face of base plate 179.

A number of Type I three-function pull valves are in actual use in a testing program. These pull valves have an overall length of 3.849 inches, width of 2.125 inches, and thickness of .719 inch. The maximum stroke of 1.670 inches of the actuator slide is produced by cable stroke of 1.125 inches. The actuator slide maintains 3.7 pounds tension in the harness cable when cam roller 169 is not touching a valve actuator rod; this cable tension increases to 4.7 pounds when the roller is deflecting an actuator rod. The amputee through sensory perception of this varying cable tension can feel each position of the valve and can thereby control the motion and position of the three-functional elements of his prosthesis.

The Type I three-function pull valve 150 may be mounted inside the upper arm shell or within the shoulder cap of the prosthesis when and if space permits. When internal mounting is inconvenient the valve which is flat and thin may be mounted externally on the back of the shoulder cap. It may be wrapped with sound absorbing material such a ½ inch thick, No. 80 porosity, polyurethan foam material to muffle the sibilance of the exhaust.

The three-function (six phase) pull valve Type II, shown in FIGS. 25 through 28 is based on the same general operating principle as the pull valves previously described; its construction, however, is somewhat different.

The Type II valve 200 comprises a generally rectangular valve mounting block 201 having a longitudinal recessed area 202 at its top surface and a longitudinal T-shaped channel 203 in its bottom surface. T-shaped channel 203 consists of central groove 203a and a pair of rails 203b spaced on opposite sides of the central groove. Three pairs of opposed transverse rectangular openings 204, 205 and 206 are cut into valve mounting block 201 to a depth which includes a portion of rails 203b.

Three standard valve block modules 1, 1′ and 1″ are mounted on valve mounting block 201, the bottom faces of the valve block modules being received in longitudinal recessed area 202 and the valve actuator rods (e.g., 10 and 14) of each valve module being received in one pair of opposed transverse rectangular openings. A hollow roller sleeve 207 is slipped over the bottom portion of each valve actuator rod before the valve modules are mounted on the valve mounting block. The valve modules are affixed to valve mounting block 201 by square washers 208 and screws 209. The square washers 208 engaged the corners of the lower lips (e.g., 8a) of the valve modules and the adjacent portion of the upper surface of valve mounting block 201. Screws 209 are received in threaded holes provided in the valve mounting block 201. The valve actuator rods and encircling hollow roller sleeves 207 project into T-shaped channel 203.

The valve actuator rods are selectively deflected by actuator slide 210. The rectangular top portion 210a of the actuator slide is adapted to be slidably received in central groove 203a. A pair of generally triangular cam lobes 211 and 212 are formed on opposite sides of the bottom portion of actuator slide 210 in spaced relation to each other. The cam lobes are adapted to slide along rails 203b; each cam lobe has a flattened dwell area 211a and 212a at its tip to assist in maintaining the actuator rods in their fully deflected position when the rods rest on the dwell areas. The valve block modules 1, 1′ and 1″ and the cam lobes 211 and 212 are so spaced in relation to each other that no more than a single valve actuator rod can be deflected at one time. Valve mounting block 201 is affixed to the top surface of generally rectangular valve cover 213 by screws 214 which are threadedly received in corresponding threaded holes in the valve cover and valve mounting block. Upstanding end plates 217a and 217b on the valve cover close off the ends of T-shaped channel 203 thereby limiting the longitudinal travel of actuator slide 210. The upper surface of valve cover 213 closes the open face of T-shaped channel 203 and provides a surface along which the bottom 210b of the valve actuator slide may ride. A threaded hole 217 b′ is provided in upstanding end plate 217b of the valve cover. The outer cable 223b of a two-part Belden cable may be screwed into this hole while the inner cable 223a passes through the hole and is affixed to actuator slide 210.

A longitudinal cylindrical bore 217 is provided in the portion of the valve cover which lies beneath T-shaped channel 203. A piston 218 having an annular groove 218a and a sealing "O" ring 218b mounted in the annular groove is slidably received in longitudinal cylindrical bore 217. Piston 218 and cylindrical bore 217 form a feedback servo motor 219 whose function is similar to that of the feedback servo motors of the pull valves previously described. A longitudinal slot 220 is provided in valve cover 213 permitting communication between a portion of cylindrical bore 217 and T-shaped channel 203. Dowel pin 221 affixed in hole 222 in the actuator slide extends downwardly into cylindrical bore 217 and bears against the back face of piston 218. When actuator slide 210 is pulled from left to right (as seen in the drawing) by actuator cable 223a the dowel pin 221 pulls piston 218 along with it. When the actuator tension is relaxed the constant pressure maintained in feedback servo motor 219 drives piston 218 backward. The dowel pin link causes actuator slide 210 to move with the piston.

Compressed gas is supplied to valve modules 1, 1′ and 1″ and to feedback servo motor 219 through gas supply fitting 224. The flow to the gas supply ports (e.g., 5c) of the valve block modules through a longitudinal passage 225 in the valve mounting block and through three vertical passages 226 which communicate with the gas supply ports of the valve block modules. "O" rings 226a seated in counterbored portions of the vertical passages insure leakproof connections. Gas is supplied to the cylinder of feedback servo motor 219 through longitudinal passage 225, lateral passage 227 in the valve mounting block, aligned vertical passages 228a and 228b in the valve mounting block and valve cover respectively, longitudinal passage 229 in the valve cover and lateral passage 230 likewise in the valve cover. Gas travelling through this network maintains a constant pressure on the piston of the feedback servo motor 219.

Although it may be used to operate and control any three-function pneumatic prosthesis, the three-function pull valve Type II is particularly suited to control a prosthesis consisting of a terminal device, wrist pronator and elbow flexor all actuated from a single body control site by one prosthetic harness cable. This three-function pull valve is generally mounted inside the upper arm shell or within the shoulder cap where it is wrapped loosely in ½ inch thick No. 80 porosity, polyurethane foam material to muffle exhaust sibilance. When used with a Belden cable the outer cable 223b is brought to the wall of the prosthetic shell and fastened there with standard screw type cable clamps (force points). The inner Belden cable 223a is attached through a swivel to the prosthetic harness. The manner by which the valve is used by an amputee to control the three servo motors of his prosthetic device will be readily understood from the drawing and description and from what has been said previously concerning the other pull valves. Feedback servo motor 219 enables the amputee to sense the position of the actuator slide and also moves the actuator slide toward its neutral position when the amputee relaxes tension on the actuating cable.

A number of three-function pull valves Type II are proving successful in experimental use. The overall dimensions of the test valves are 2.432 by 1.625 by 1.000 inches. A .930 inch cable pull moves the actuator slide through its entire operating sequence. The test valves have been made so that cable tension is 5.4 pounds free pull and 6.0 pounds when a cam lobe is deflecting one of the valve actuator rods. The cam lobes 211 and 212 are formed with 50° angles of inclination and declina- and a .05 inch dwell at the apex of each lobe.

It will be noted that the valve modules of the three-function pull valve Type II illustrated are so mounted on the valve mounting block that their positions cannot be varied to change the locations of the valve actuator rods (e.g., 10 and 14) in relation to the actuator slide. This particular embodiment does not have the adjustable response inherent in the pull valves previously described.

The feedback servo motor of this three-function pull valve and of other pull valves may be replaced by a spring; however, the use of the gas powered servo motor has proven more satisfactory.

The single function (two phase) pressure valve illustrated in FIGS. 29 through 31 was designed primarily for the separate control of a pneumatic terminal device; it can however be used to control any dual acting proportional servo motor. An amputee equipped with a prosthetic device employing this valve operates the valve by exerting pressure against an actuating arm. The pressure may be generated by such body motor sources as a shoulder, an above elbow stump, a below elbow stump or the chin.

The principal components of single function pressure valve 250 are valve body 251, a single standard valve module 1 and actuator arm subassembly 252.

The base of U-shaped valve body 251 has two shelf-like projections 253 and 254 extending therefrom on opposite sides of vertical opening 255. The inner surface of the base of valve body 251 has a rectangular recessed area 256 whose depth is equivalent to the thickness of lips 8a of the valve block module. A pair of spaced circular bores 257 adapted for valve actuator rods 10 and 14 to pass therethrough are provided in the base of valve body 251 together with a pair of spaced threaded holes 258. Screws 259 which are screwed into threaded holes 258 and square washers 260 which engage lips 8a of the valve block module and the adjacent surface of valve body 251 are used to attach the valve block module 1 to valve body 251. When the valve block module is mounted on the valve body, valve actuator rods 10 and 14 extend through circular bores 257 beyond shelf projections 253 and 254. Gas under pressure is fed to gas supply port 5a of valve module 1 through gas supply fitting 259 and internal passage 260 formed within one arm and the base of valve body 251. The end of internal passage 260 adjacent to gas supply port 5a includes a counterbored portion 260a adapted to receive "O" ring 260b.

The actuator arm subassembly 252 comprises a pair of spaced rocker arms 261 joined at their distal ends by a transverse curved pad 262. Actuator arm subassembly 252 is mounted on top of valve body 251 with each rocker arm 261 lying outside the adjacent arm of valve body 251, and connected thereto by roll pins 263. A tension type return spring 264 is attached to tab portion 261a of each rocker arm and to spring anchor pin 265 which is affixed to the adjacent arm of valve body 251.

The actuator arm subassembly 252 is capable of a limited degree of rotational motion about roll pins 263. The residual tension of return springs 264 hold the actuator arm subassembly in its normal or neutral position with tabs 261a bearing against the top of valve body 251 until a predetermined pressure is exerted upon the top of curved pad 262.

A generally rectangular actuator block 266 depends from the bottom of curved pad 262 and is affixed thereto. Actuator block is so located that when the curved pad is depressed, a portion of the actuator block moves within vertical opening 255. Two cam lobes 268 and 269 are disposed in staggered positions on opposite sides of actuator block 266. The distal end of each cam lobe may be hemispherical in shape and the portion of the cam lobe facing the base of valve body 251 may be flattened. The cam lobes are so proportioned and so situated that when curved pad 262 is pressed cam lobe 268 will first deflect valve actuator rod 14. Cam lobe 268 will then clear valve actuator rod 14 and cam lobe 269 will deflect valve actuator rod 10.

From the foregoing description it will be apparent than an amputee equipped with a single function pressure valve 250 may, by depressing curved pad 262 and by releasing pressure therefrom, regulate the flow of air through a single valve block module and thereby control a single function gas powered prosthetic device.

A full size working model of the single function pressure valve, which measures 1.867 by 1.144 by .592 inch, is in field use. The total stroke through which the curved pad can be moved is .312 inch and the actuating force required is 16 ounces. If one of the return springs 264 is eliminated, the actuating force required to depress the curved pad is only 8 ounces.

The two-function (four phase) shift valve 300 illustrated in FIGS. 32 through 35 is designed for the control of two separate dual acting servo motors such as the elbow flexor servo motor and the wrist pronator servo motor of a gas powered prosthetic device. The two-function shift valve operates on the "joy stick" or square shift principle; a swivelling shift lever is used by the amputee to trip singly, or in combination, the valve actuating rods of two standard valve block modules mounted at right angles to each other.

The two-function shift valve 300 comprises an L-shaped valve body 301 having rectangular recessed areas 302 and 303 in the outside face of each leg. Valve block module 1 is mounted on recessed area 302 by means of square washers 304 and screws 305; valve module 1' is mounted in recessed area 303 by means of square washers 306 and screws 307. The square washers engage the lower lips (e.g., 8a) of the valve block modules and the adjoining portions of the outside faces of the valve body. Screws 305 and 307 are screwed into threaded holes 308 and 309, respectively, provided in the valve body. The axes of threaded holes 308 are located in a plane which is higher in the valve body than the plane including the axes of threaded holes 309. Spaced rectangular openings 310 and 311 are provided in each leg of valve body 301. The valve actuator rods 10, 14, 10' and 14' of the valve block modules extend through these rectangular openings, valve actuating rods 10 and 14 overlapping valve actuating rods 10' and 14'. When viewed from above or below the overlapping valve actuator rods form a square.

Compressed gas is supplied to each valve block module through gas supply fitting 312 and internal passage 313 within valve body 301. Branches 313a and 313b of internal passage 313 communicate with ports 5c and 5c', respectively, of valve modules 1 and 1'. "O" rings, not shown, received in counterbored ends of branches 313a and 313b insure tight seals at ports 5c and 5c' respectively.

Valve body 301 is affixed to the top of generally pentagonal actuator plate 316 which has a pair of upstanding tab portions 317 and 318. The valve body and actuator plate are held together by a pin 319 fixed in the valve body and received in hole 317a and by screw 320 which passes through hole 318a and upstanding tab 318 and engages threaded hole 321 in the valve body.

Shift lever 322, used by the amputee to deflect the valve actuator rods, comprises an actuator lever assembly 323 mounted for swivelling motion on actuator plate 316 and actuator button assembly 324 attached to the top of actuator lever assembly 323.

Actuator lever assembly 323 comprises a generally cylindrical socket 325 having a hexagonal flange 326 at one end and a threaded portion 327 at the other end. An annular groove 328 is formed between the flange and the threaded portion. Actuator socket 325 is affixed to actuator plate 316 the body of the socket extending downward through a circular opening in the actuator plate with flange 326 abutting the top surface of the actuator plate. Nut 327a screws onto threaded portion 327 of the actuator socket. Hole 329 having a conical shaped bottom 329a and a relatively large countersunk zone 329b at its top is provided in actuator socket 325.

The actuator lever proper 330 has a hemispherical "ball" 331, a neck 332 and a tapered zone 333 at its proximal end; the actuator lever has a threaded portion 334 and a land zone 335 at its distal end. Ball 331 of the actuator lever is received at the bottom of hole 329 and is held there by C-shaped lock ring 336 seated in annular groove formed in the wall of hole 329.

When actuator lever 330 is so mounted in actuator socket 325 the actuator lever extends upwardly through the center of the square formed by the overlapping valve actuator rods 10, 14, 10' and 14'. The actuator lever is capable of swivelling motion about ball 331 in any direction so that it may deflect a single valve actuator rod or it may deflect two rods simultaneously at a point of overlapping. The threaded portion 334 of actuator lever 330 extends upwardly above the valve actuator rods.

Actuator button assembly 324 which contacts the control site on the amputee's body and by which he causes shift lever 322 to swivel in a desired direction is resiliently mounted on the distal end of actuator lever 330. The actuator button is capable of a limited degree of motion along the longitudinal axis of the actuator lever. Continuous contact between the actuator button and the amputee's control site is thus assured.

Actuator button assembly 324 comprises a plunger 337 having a cylindrical body portion 338 and a hexagonal flange 339 which is slidably received within the circular bore 341 of cylindrical sleeve 340. A circular opening 342a corresponding in size to the body portion 338 of the plunger is provided in end wall 342 of sleeve 340.

Piano wire spring 343, under continuous compression, circles body 338 of the plunger. The spring is seated at the flange end of plunger 337 in groove 339a; the other end of the spring bears against the inner surface of end wall 342 of the cylindrical sleeve. The plunger and cylindrical sleeve are prevented from separating by washer 344 of larger diameter than circular opening 342a which is riveted to the end of plunger 336.

The upper portion 340a of the outer wall of cylindrical sleeve 340 is threaded and is received in a correspondingly threaded hole 346 provided in the bottom of nylon actuator button 345. A cylindrical cavity 347 is formed within the nylon button above threaded hole 346.

When shift lever 322 is completely assembled, the nylon button will be held in its normal uppermost position by the residual compression of spring 343. When a downward force is exerted on nylon button 345 the button and sleeve combination will slide downwardly upon plunger 337. The portion of the plunger which projects above cylindrical sleeve 340 is accommodated by cavity 347 within nylon actuator button 345.

The two-function shift valve is particularly suited for use with a gas powered shoulder disarticulation prosthesis. The amputee can operate the shift lever by manipulating the tip of the humerus. The shift valve may, however, be used in other applications; for example the valve may be mounted inside the upper arm shell of the prosthesis of an above elbow amputee. This type of amputee can operate the shift lever by moving the distal end of his stump. This shift valve may also be useful in situations of congential anomaly where the "joy stick" type shift lever can be manipulated by phocomelic fingers.

When used with a shoulder disarticulation prosthesis the two-function shift valve 300 is mounted inside the shoulder cap and located so that actuator button 345 is in contact with the skin over the tip of the humerus. The button is spring loaded to achieve a contact pressure along its axis (e.g., in the order of 8 ozs.) which enables the amputee through humeral motion to exert the small force (e.g., in the order of 16 ozs.) required to move the shift lever and deflect the valve actuator rods. An adjustable mounting bracket for the two-function shift valve may be provided to facilitate accurate positioning of the actuator button in relation to the humerus.

A number of pilot models of the two-function shift valve are being tested in every day use by amputees. The overall dimensions of the pilot models are 1.830 by 1.780 by 1.375 inches. The maximum travel of the actuator button along the axis of the shift level is .250 inch humeral motions of .200 inch in each of four directions enables the amputee to control the valve completely.

An explanation of how an amputee might use a two-function shift valve to control gas powered prosthesis having a pneumatic elbow flexor and a pneumatic wrist rotator may facilitate understanding the invention:

(a) By raising the tip of his humerus, the amputee flexes the elbow to any predetermined degree. He may then block the elbow in this position by backing off the button entirely or by moving it to a neutral position.

(b) By lowering the tip of the humerus, the amputee may extend the elbow to any predetermined degree and then block the elbow in the desired position by backing off the button entirely or by moving the button to the neutral position.

(c) By moving the tip of the humerus forward, the amputee can pronate the wrist and thereafter block it in the usual manner.

(d) By moving the tip of the humerus backward, the amputee can supinate the wrist and thereafter block it in the usual manner.

(e) By moving the tip of the humerus at a 45° angle upward or downward along a diagonal line, wrist and elbow motions can be combined, for example, elbow flexion can be combined with either pronation or supination of the wrist.

It is unlikely that an amputee will actuate the two-function shift valve involuntarily inasmuch as when the amputee relaxes, contact between the body control site and the actuator button is usually broken.

The screw and square washer type mounting of valve block modules 1 and 1' on the valve body permits independent adjustment of the position of the two modules so that the maximum speed of response can be preset. The amount of adjustment may be somewhat less than with the pull type valve, however, adequate and useful adjustment is possible. When a valve module is moved toward the base plate, the rate of response of the mechanism controlled by that module is reduced; when a module is moved away from the base plate, the rate of response is increased.

From the foregoing description it should be apparent that the basic valve module and the various functional control valves described herein have other applications besides their primary use in gas powered prosthetic devices. They may be used in gas powered orthotic braces and devices, e.g., flail arm braces. They potentially may be used for the remote control of pneumatic servo drives in machine handling equipment or for the automatic control of machine tools. The two-function pull valve, for instance, operated by a polarized relay drive or a stepped solenoid, might be used to control the bi-planar coordinated table motions of an automatic profile milling machine.

It should also be apparent that the embodiments illustrated and described may be modified in many particulars without departing from the principle of the invention.

I claim:

1. A valve module comprising:
   (a) a valve body having entry and exit ports and a passage interconnecting said ports;
   (b) yieldable sealing means within said passage; and
   (c) actuator rod means mounted in said valve body, said rod means extending through and sealingly engaging said sealing means when in the relaxed position, said rod means also extending outwardly from said body and being associated with said sealing means so that said rod means when deflected will disengage from said sealing means and thereby open said passage.

2. A valve module comprising:
   (a) a valve body having first gas and vent ports, second gas and vent ports, a gas supply port and normally closed passages interconnecting the gas supply port and the two gas ports, a normally closed passage interconnecting the first gas port and the second vent port, and a normally closed passage interconnecting the second gas port and the first vent port;
   (b) yieldable sealing means within said passages; and
   (c) first and second actuator rods mounted in said valve body and sealingly engaging said means, said rods extending outwardly from said body and associated with said first gas and first vent ports and with said second gas and second vent ports respectively, each actuator rod adapted when deflected to disengage from the sealing means in the passage between the gas supply port and the gas port associated with said rod and the sealing means in the passage between the vent port associated with said rod and the gas port associated with the other rod thereby opening said passages.

3. A valve module for controlling the flow of gas to and from a dual acting servo motor comprising:
   (a) a molule body having a pair of parallel circular bores therethrough;
   (b) a tubing fitting provided at the top of each said bore adapted to be connected by a conduit to one side of the dual acting servo motor;
   (c) upper, intermediate and lower "O" ring means disposed in spaced relationship within each said bore and in contact with the surface of said bore;
   (d) a valve actuator rod disposed in each of said bores passing through the three "O" rings located therein having an intermediate land zone seated on said intermediate "O" ring and a part of its lower portion projecting outwardly from the bottom of said bore, said "O" rings forming a seal between said actuator rods and said "O" rings and between said bore and said "O" rings when said actuator rods are in the neutral position;
   (e) an upper chamber within each of said bores between said upper "O" ring and said tubing fitting;
   (f) an intermediate chamber within each of said bores between said upper "O" ring and said intermediate "O" ring;
   (g) a lower chamber within each of said bores between said intermediate "O" ring and said lower "O" ring;
   (h) gas supply passages formed in said module body communicating with said intermediate chambers; and
   (i) gas passages in said module body interconnecting the upper chamber of each bore and the lower chamber of the other bore; whereby when one of said actuator rods is deflected the associated upper and lower "O" rings are deformed and gas from the gas supply passage may flow past said upper "O" ring to one side of the dual acting servo motor while gas from the other side of the dual acting servo motor may vent past said lower "O" ring.

4. A valve module as described in claim 3:
   (a) wherein said module body is generally rectangular in shape and has lateral grooves and lips formed in a pair of opposite sides near the bottom thereof;
   (b) wherein the three "O" rings within each cylindrical bore and the elements maintaining said "O" rings in spaced relation comprise consecutively a cylindrical adapter having a lower split ring portion, the upper "O" ring, a split ring spacer, the land zone of the actuator rod, the intermediate "O" ring, a split ring spacer, the lower "O" ring and a lower cylindrical spacer, said cylindrical adapter having an axial bore in which the tubing fitting is seated, and said lower cylindrical spacer having a vent port through which the actuator rod extends, said vent port being of larger diameter than said actuator rod;
   (c) wherein the upper intermediate and lower "O" rings are so spaced that said upper "O" ring is closer to the axis about which said actuator rod deflects than said lower "O" ring whereby said lower "O" ring is deformed to a greater extent than said upper "O" ring when said actuator rod is deflected; and
   (d) wherein said gas supply passages terminate in a gas supply port located in the bottom of said module body between said actuator rods.

5. A single function cable actuated pull valve for controlling the flow of gas, furnished by a gas supply source, to and from a dual acting servo motor comprising:
   (a) a valve body having a longitudinal slot;
   (b) an actuator block, connected to the actuating cable, slidably received in said longitudinal slot and having cam means thereon;
   (c) a valve module having a pair of actuating rods extending into said longitudinal slot adadapted to be separately deflected by said cam means;
   (d) conduits and passages adapted to selectively interconnect the gas supply source, valve module and servo motor when said actuator rods are deflected by said cam means; and
   (e) resilient resistance means associated with said actuator block and opposing any tension in the actuating cable.

6. A single function cable actuated pull valve for controlling the flow of gas furnished by a gas supply source to and from a dual acting servo motor comprising:
   (a) A valve body having a longitudinal slot and a pair of parallel bores normal to said slot;
   (b) A valve module mounted on said valve body having a gas supply port, a pair of gas ports adapted to be connected to a dual acting servo motor, a pair of vent ports, passages interconnecting said ports and a pair of actuator rods extending through said parallel bores into said longitudinal slot;
   (c) A gas supply conduit adapted to connect a gas supply source with the gas supply port of the valve module;
   (d) A cable pullable, actuator block, slidably received in said longitudinal slot, having cam means adapted to separately deflect said actuator rods, whereby the rate and direction of gas flow to and from a dual acting servo motor can be controlled; and
   (e) Resilient resistance means associated with said actuator block and adapted to return said actuator block to its initial position when tension on the actuating cable falls below a predetermined value.

7. A single function pull valve as described in claim 5:
   (a) Wherein said gas supply conduit includes a passage formed within said valve body; and
   (b) Wherein said resilient resistance means comprises a feedback servo motor having a cylinder formed in said actuator block, a stationary piston positioned in the longitudinal slot of said valve body and received in said cylinder, and a gas supply passage interconnecting the gas supply source and said cylinder.

8. A plural function cable actuated pull valve for controlling the flow of gas furnished by a gas supply source to and from a plurality of dual acting servo motors comprising:
   (a) A valve body having a longitudinal slot;
   (b) An actuator block, responsive to the actuating cable, slidably received in said longitudinal slot and having cam means thereon;
   (c) A plurality of valve modules, each module adapted for connection to individual dual acting servo motors and each module having a pair of actuating rods extending into said longitudinal slot adapted to be separately deflected by said cam means;
   (d) Conduits and passages adapted to selectively interconnect the gas supply source, each valve module and the associated servo motor when the actuator rods of said valve module are deflected by said cam means; and
   (e) Resilient resistance means associated with said actuator block and opposing any tension in the actuating cable.

9. A plural function cable actuated pull valve as described in claim 8 wherein said valve modules are mounted longitudinally on said valve body so that the actuator rods are aligned with each other in a single line.

10. A plural function cable actuated pull valve as described in claim 8:
   (a) Wherein said valve modules are mounted transversely on said valve body so that the actuator rods are aligned with each other in two lines, one actuator rod of each module being in each line; and
   (b) Wherein said actuator block has two cam lobes on opposite sides thereof and is adapted to travel in the space between said lines of actuator rods.

11. A plural function cable actuated pull valve as described in claim 8 having in combination therewith:
   (a) A base plate affixed to said valve body adjacent said longitudinal slot and spaced from said valve body;
   (b) A rocker arm pivotally attached at its proximal end to said base plate and generally parallel to said longitudinal slot;
   (c) A roller arm disposed between said base plate and said valve body, pivotally attached at one end to the distal end of said rocker arm and at the other end to the actuator block; and
   (d) Actuating cable connecting means attached to said roller arm intermediate its ends.

12. A plural function cable actuated pull valve as described in claim 8:
   (a) Wherein said valve body has a plurality of pairs of parallel bores normal to the longitudinal slot and the actuator rods extend through said bores; and
   (b) Wherein each valve module has a gas supply port, a pair of gas ports adapted to be connected to the associated dual acting servo motor, a pair of vent ports, and passages interconnecting said ports.

13. A plural function cable actuated pull valve as described in claim 12:
   (a) Wherein the conduits and passages by which said gas supply ports are connected to the gas supply source include passages formed within said valve body; and
   (b) Wherein said resilient resistance means comprises a feedback servo motor having a cylinder formed in said actuator block, a stationary piston positioned in the longitudinal slot of said valve body and received in said cylinder, and a gas supply passage interconnecting the gas supply source and said cylinder.

14. A single function pressure valve for controlling the flow of gas furnished by a gas supply source to and from a dual acting servo motor comprising:
   (a) A valve body having a pair of spaced holes therethrough;
   (b) A valve module mounted on said valve body having a pair of actuating rods extending through said spaced holes;
   (c) A pressure responsive pad pivotally mounted on the valve body, valve module assembly and movable between a normal elevated position and a fully depressed position;
   (d) An actuator block having two cam lobes on opposite sides thereof, affixed to said pressure responsive pad, said cam means adapted when said pad is depressed to separately deflect said actuator rods;
   (e) Conduits and passages adapted to selectively interconnect the gas supply source, valve module and servo motor when said actuator rods are deflected by said cam means; and
   (f) Resilient resistance means coacting with said pad and returning said pad to its normal elevated position where pressure on said pad is relieved.

15. A single function pressure valve as described in claim 14:
   (a) Wherein the valve body is generally U-shaped and the valve module is mounted on the base of said U;
   (b) Wherein the valve module has a gas supply port, a pair of gas ports adapted to be connected to the dual acting servo motor, a pair of vent ports, and passages interconnecting said ports;
   (c) Wherein the conduits and passages by which said gas supply port is connected to the gas supply source includes a passage formed within said valve body;
   (d) Wherein said pressure responsive pad is affixed to the first ends of a pair of spaced rocker shaped arms;
   (e) Wherein said rocker arms are pivotally attached at intermediate locations to the outer faces of the leg portions of said valve body; and
   (f) Wherein said resilient resistance means includes spring means interconnecting the second end of a rocker arm to said valve body.

16. A two-function shift valve for controlling the flow of gas, furnished by a gas supply source, to and from two dual acting servo motors comprising:

(a) A base having a socket therein;
(b) A valve body including two legs forming substantially a right angle, each leg having a pair of spaced transverse openings, said valve body attached to said base;
(c) Valve modules adapted for connection to individual servo motors, each valve module servo motor having a pair of actuator rods, mounted on each of said legs, the actuator rods of one module overlying the actuator rods of the other module and forming a square pattern therewith over the socket in said base;
(d) A shift lever swivel mounted in said socket and extending upward through the square formed by said actuator rods adapted thereby to deflect said actuator rods separately or by twos; and
(e) Conduits and passages adapted to selectively interconnect the gas supply source, each valve module and the associated servo motor when said actuator rods are deflected.

17. A two-function shift valve as described in claim 16:
   (a) Wherein each valve module has a gas supply port, a pair of gas ports adapted to be connected to the associated servo motor, a pair of vent ports, and passages interconnecting said ports; and
   (b) Wherein the conduits and passages by which said gas supply port are connected to the gas supply source include passages formed within said valve body.

18. A two-function shift valve as described in claim 16 wherein the shift lever comprises an actuating lever having an enlarged actuator button resiliently mounted at the distal end thereof, said button capable of limited movement along the longitudinal axis of said actuating lever.

19. A valve for controlling the flow of gas furnished by a gas supply source to and from the dual acting servo motors of a pneumatic prosthesis comprising:
   (a) A valve body having at least one pair of parallel bores therethrough, a gas supply fitting adapted to be connected to the gas supply source and a gas supply passage connected to said fitting;
   (b) A valve module associated with each pair of parallel bores, having a gas supply port connected to said gas supply passage, a pair of gas ports adapted to be connected to a servo motor, a pair of vent ports, passages interconnecting said ports, and a pair of actuator rods extending through the parallel bores associated with said valve modules; and
   (c) Cam means associated with said valve body adapted to selectively, separately deflect said actuator arms whereby the servo motors and associated functions of the pneumatic arm can be controlled.

20. A single function cable actuated pull valve for controlling the flow of gas, furnished by a gas supply source to and from a dual acting servo motor comprising:
   (a) A valve body having a longitudinal slot;
   (b) An actuating cable having one end thereof connected to an actuator block, said actuator block being slidably mounted in said longitudinal slot;
   (c) Cam means on said actuator block;
   (d) A valve module having a pair of parallel circular bores, a gas supply port connected to the supply of pressure gas, a pair of gas ports each associated with one of said bores and adapted to connect to opposite sides of the dual acting servo motor, a pair of vent ports each associated with one of said bores; internal passages, normally closed, connecting the gas supply port with each gas port and connecting the gas port associated with each bore with the vent port associated with the other bore;
   (e) A valve actuator rod mounted in each of said bores, a portion of each actuator rod extending outwardly from said module body, each actuator rod adapted when deflected to open the passage between the gas supply port and the gas port associated with said actuating rod and to open the passage between the vent port associated with said actuating rod and the gas port associated with the other actuating rod; each of said actuator rods extending into said longitudinal slot and adapted to be selectively deflected by said cam means; and
   (f) Resilient resistance means associated with said actuator block opposing any tension in said actuating cable.

References Cited by the Examiner
UNITED STATES PATENTS

| | | | |
|---|---|---|---|
| 2,261,444 | 11/1941 | Neubert | 137—596 |
| 2,323,947 | 7/1943 | Werff | 137—596 |
| 2,393,805 | 1/1946 | Parker | 91—455 X |
| 2,763,406 | 9/1956 | Countryman. | |
| 2,781,781 | 2/1957 | Hruska | 137—596.2 X |
| 2,866,478 | 12/1958 | Hyde | 137—636 |
| 2,946,555 | 7/1960 | Cantor | 251—342 |
| 3,025,878 | 3/1962 | Hupp | 137—315 |
| 3,056,421 | 10/1962 | Carls | 137—315 |

M. CARY NELSON, *Primary Examiner.*

SAMUEL LEVINE, *Examiner.*